United States Patent [19]
Rhodes

[11] 4,027,480
[45] June 7, 1977

[54] HYDRAULIC ENGINE

[76] Inventor: William A. Rhodes, 4421 N. 13th Place, Phoenix, Ariz. 85014

[22] Filed: Dec. 29, 1975

[21] Appl. No.: 644,542

[52] U.S. Cl. .................................... 60/531; 60/641
[51] Int. Cl.² ...................... F01K 25/10; F03G 7/02
[58] Field of Search ................. 60/530, 531; 251/11

[56] References Cited

UNITED STATES PATENTS

| | | | |
|---|---|---|---|
| 3,778,121 | 12/1973 | Alexander et al. | 60/531 X |
| 3,911,682 | 10/1975 | Thompson | 60/531 |
| 3,921,402 | 11/1975 | Thompson | 60/531 |
| 3,932,994 | 1/1976 | Thompson | 60/531 |

*Primary Examiner*—Allen M. Ostrager
*Attorney, Agent, or Firm*—Warren F. B. Lindsley

[57] ABSTRACT

A hydraulic engine for the conversion of thermal energy as from the sun into reciprocating mechanical energy, the engine comprising a long cylindrical pipe filled with water and having a thermal receiver at one end and a bellows at the other end. Boiling of the water at the receiving end of the pipe by the thermal energy sets up pressure and displacement wave-fronts which travel down the length of the pipe to expand the bellows and to actuate the connected mechanical load.

15 Claims, 10 Drawing Figures

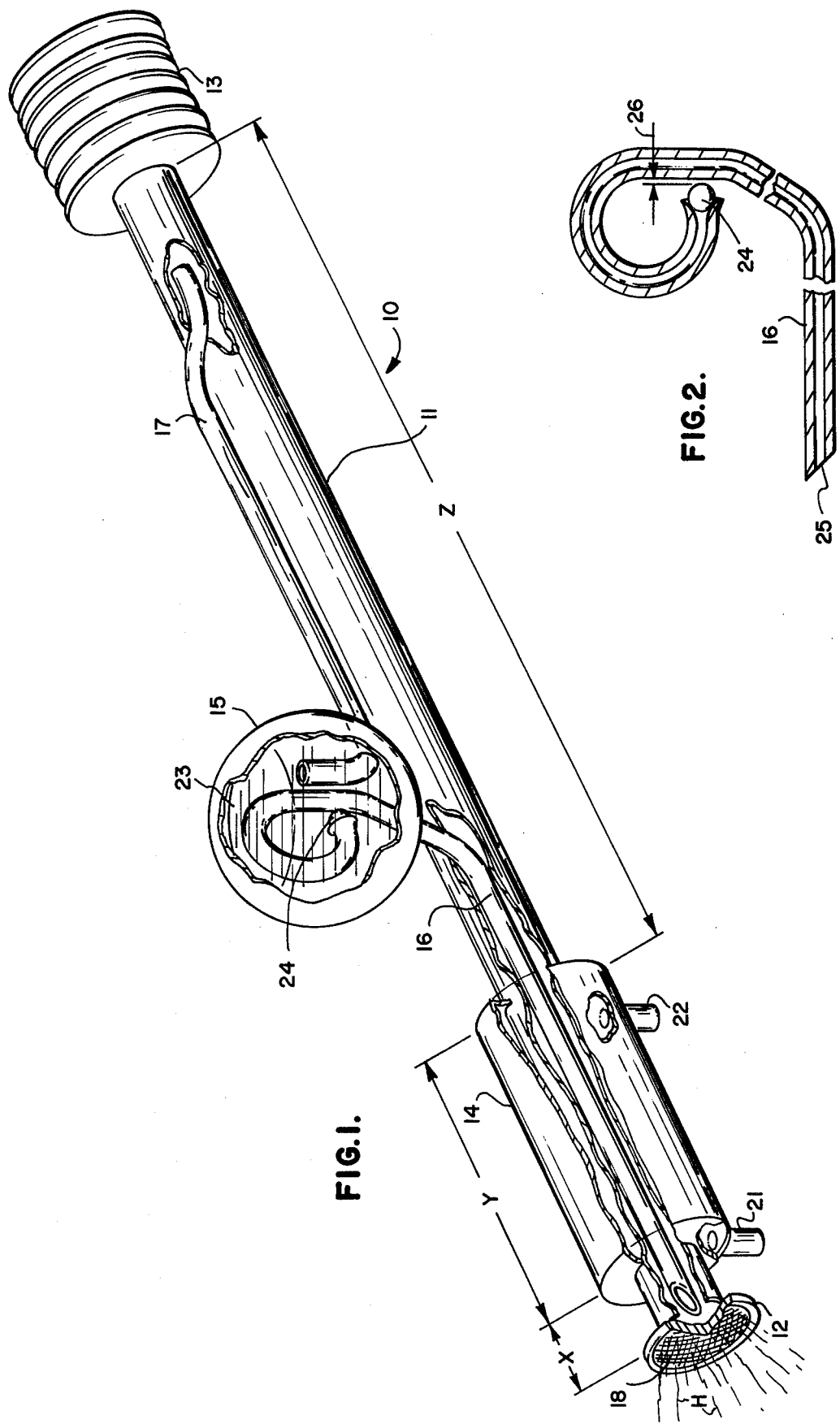

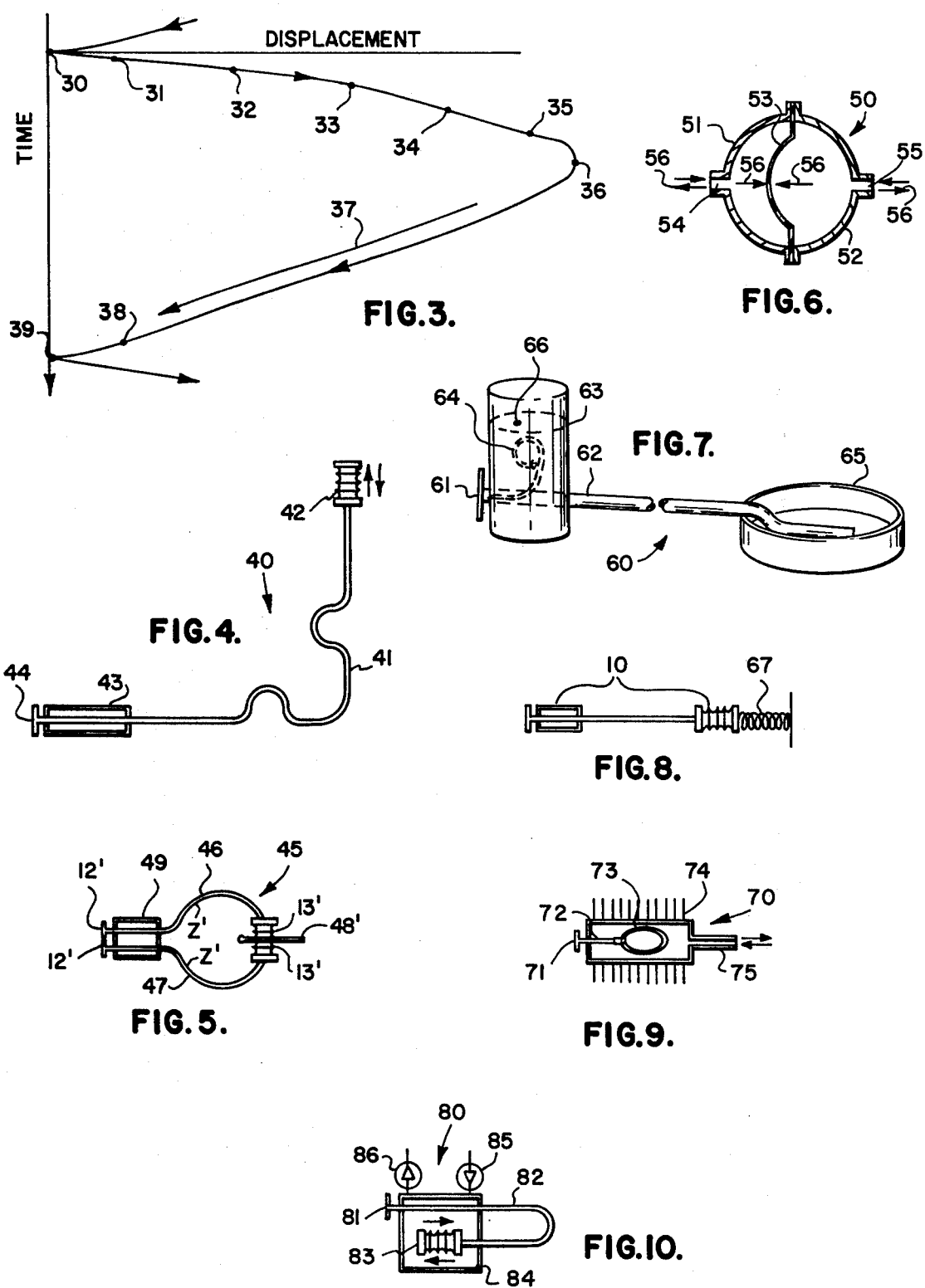

HYDRAULIC ENGINE

BACKGROUND OF THE INVENTION

In recent years, the rapid expansion of the world's population coupled with the accelerated technological development of large sectors of the world has produced a dramatic increase in the demand for energy in all forms including fuels and electricity for heating, lighting, transportation and manufacturing processes. The construction of hydroelectric facilities and the development of fossil fuel resources has continued at a rapid rate, but it becomes increasingly evident for a number of reasons that these efforts are inadequate to keep pace with the demands of the growing population.

A first difficulty is the limited availability of fuels such as oil and natural gas. Most countries in the world today do not have adequate sources of these fuels within their own boundaries and are dependent upon foreign sources, notably the Middle East countries for supply. Such a dependence can and does have undesirable effects on the economies of the countries involved and political complications often result. There are also limited sites available that are appropriate for hydroelectric installations.

In the United States, there are a number of fossil fuels available such as high sulphur coal and oil shale, but the development and use of these resources has been complicated by economic and environmental concerns which rule against the use of these resources for a number of reasons including the destructive effects of strip mining, atmospheric contamination due to the high sulphur content of the coal, the cost of extracting the oil from the shale, etc.

More recently, the hope that nuclear power would soon lead to a rapid solution of the energy dilemna has been cooled by delays stemming again from environmental concerns and reservations about the safety of such plants and about the adequacy of plans for handling the radioactive wastes associated with such installations.

In the face of these growing demands and limited resources, there is one source of energy which is readily available to every country in the world in virtually unlimited quantities. This virtually untapped source is solar energy. *The World Book Encyclopedia* (copyright 1963, USA) states that the amount of solar energy reaching the earth in 1 day equals the energy that could be produced by burning 550 billion tons of coal – as much coal as would be dug in the United States in 1000 years at the 1963 rate of mining. It further states that enough solar energy reaches the United States in 20 minutes to fill the country's entire power needs for 1 year.

The interest in this almost boundless resource and in its development and harnessing for use in homes and factories is rising as other resources dwindle. Its desirability is further enhanced by the fact that solar energy may be converted to practical use without the hazard of environmental contamination.

Prior Art

Until recently, the development of solar energy collectors has been associated for the most part with programs involving military and space applications while only limited attention has been given to broad consumer use. As a result, there is a great potential for improvements in existing collection devices that will result in reduced manufacturing costs and improved thermal efficiencies.

One such device known as a flat plate collector is described by *The World Book Encyclopedia* (copyright 1963). It is made of metal and glass with one or more layers of glass laid over a blackened metal plate. Air spaces are provided between the layers of glass. Air or water passes through tubes under the metal plate to remove the collected thermal energy. The layers of glass in cooperation with the blackened metal plate act as a heat trap, letting in the sun's rays but keeping most of the heat from escaping again.

A major disadvantage of the flat plate collector is that it must be very large in order to collect sufficient energy, the large size resulting in part from the fact that except for brief periods during the day its surface is not perpendicular to the rays of the sun.

A second disadvantage is that the flat plate collector does not permit the concentration of solar energy at a localized point as needed for the most effective heating of the water and the conversion of water to steam, such as required in certain solar-to-electrical conversion processes.

To circumvent these shortcomings parabolic reflectors have been utilized along with sun-tracking mechanisms in connection with various schemes for the collection, conversion and utilization of solar energy. Variations of such equipment are described in U.S. Pat. Nos. 495,163 Apr. 11, 1893); 787,145 (Apr. 11, 1905); 820,127 (May 8, 1906); and 3,713,727 (Jan. 30, 1973).

A common problem encountered in all such utilizations of the parabolic reflector has been the difficulty in providing a compact and efficient thermal to mechanical or thermal to electrical energy converter. Because such a converter should desirably be mounted directly to the moving platform which directs the reflector toward the sun it must be a small, lightweight device which is capable of accepting the point source of heat energy and converting it to the desired form of output energy. Various types of steam turbines and other engine types have been proposed, but in most cases specific solutions have not been defined in detail.

While such prior art inventions do suggest workable approaches for the realization of the important objectives involved, the particular implementations described in these patents have in general fallen short of what is required in a low cost and practical system suitable for application and use by the typical homeowner or industrial operation.

SUMMARY OF THE INVENTION

In accordance with the invention claimed, an improved hydraulic engine is provided which is ideally suited to meet these requirements. The engine receives concentrated thermal energy at one end of a long cylindrical pipe and delivers reciprocating mechanical energy through a bellows attached at the opposite end.

It is therefore one object of this invention to provide an improved engine for the conversion of thermal energy to mechanical energy.

Another object of this invention is to provide in such an engine a capability for receiving the thermal energy from a point source as provided by a parabolic reflector.

A further object of this invention is to provide such an engine in an extremely simple form which utilizes a minimum number of moving parts and which consequently will require little or no maintenance and will enjoy a long and trouble free operating life.

A still further object of this invention is to provide such an engine in a compact and inexpensive form so that it may be economically acceptable for a wide range of applications including but not limited to solar energy converters for industrial or home use.

Further objects and advantages of the invention will become apparent as the following description proceeds and the features of novelty which characterize this invention will be pointed out with particularly in the claims annexed to and forming a part of this specification.

BRIEF DESCRIPTION OF THE DRAWING

The present invention may be more readily described by reference to the accompanying drawing, in which:

FIG. 1 is a perspective view of the hydraulic engine of the invention with portions of the engine walls cut away to reveal inner details of construction;

FIG. 2 is a cross-sectional view of a critical part of the engine of FIG. 1;

FIG. 3 is a time motion diagram which is useful in describing the operation of the engine of FIG. 1;

FIG. 4 is a representation of an implementation of the engine of FIG. 1 which is adapted for remote power delivery;

FIG. 5 illustrates another embodiment of the invention incorporating a push-pull implementation for driving vibrating reed or lever at high speed;

FIG. 6 illustrates a hydraulic isolator for use in conjunction with the hydraulic engine of the invention, the isolator providing a means for imparting the energy delivered by the invention to a secondary body of fluid or to a hydraulic system while blocking entry of the secondary fluid to the internal engine chamber;

FIG. 7 is a perspective view of a further embodiment of the invention wherein an open rather than a closed hydraulic system is employed;

FIG. 8 is an illustration of the application of the preferred embodiment of the invention as applied to drive a high speed mechanical load;

FIG. 9 is an illustration of an embodiment of the invention in a variation which is applicable as a boat engine; and FIG. 10 is an illustration of yet another embodiment of the invention as adapted for use as a pump.

DESCRIPTION OF THE PREFERRED EMBODIMENT

Referring more particularly to the drawing by characters of reference, FIG. 1 discloses the improved hydraulic engine 10 comprising a long hollow tubular body 11 with a heat absorbing or receiver head 12 attached at its forward end, and a bellows 13 attached at its rearward end. Surrounding a portion of body 11 is a cooling jacket 14. The body 11, head 12, bellows 13 and cooling jacket 14 constitute the primary system of engine 10. In addition, engine 10 is equipped with a container 15 which is coupled to the forward end of tubular body 11 by an exhaust capillary 16 and to the rearward end of body 11 by a return capillary 17. The container 15 and capillaries 16 and 17 constitute the secondary system of engine 10.

In a practical implementation of the engine, body 11 may be constructed from copper tubing of a three-eighths inch outer diameter and a one-fourth inch inside diameter.

The head 12 may be made from a copper disc one-sixteenth inch thick which is brazed to the forward end of body 11. A surface coating of brass is built up on the forward face of head 12 to form a convex surface 18.

The water jacket 14 is cylindrical and it concentrically surrounds body 11. Attached to the underside of the outer wall of water jacket 14 at opposite ends thereof are a pair of inlet and outlet ports 21 and 22 respectively.

Bellows 13 of the disclosed implementation may be formed from an ordinary automobile thermostate by discarding all parts other than the bellows itself. Its open end is brazed to the rearward end of body 11 and its rearward face is closed off by a flat plate.

The container 15, while shown as spherical in form, may take any shape consistent with mechanical producibility and with the functional requirement that it be capable of withstanding the significant internal pressure to which it is to be subjected.

The capillaries 16 and 17 should be as small as possible in terms of their inside diameters, preferably smaller than one eighth inch tubing.

The exhaust capillary 16 leads from a point inside body 11 near head 12 through the part of body 11 which is surrounded by water jacket 14, the wall of body 11 and thence through the wall of container 15. Inside of container 15 this exhaust capillary 16 curves upward then back downward curling back toward itself and terminating just short of contacting its first rising portion, as shown. Its termination is fitted with a nylon ball type check valve 24 which permits gas or fluid to be exhausted into container 15 from capillary 16 but prevents gas from leaving container 15 therethrough.

The return capillary 17 commences from a point inside body 11 near the attachment of bellows 13 and it leads through the wall of body 11 and thence upward through the wall of container 15. Inside container 15, it extends upward terminating at a point near the termination of capillary 16, both terminations being near the geometric center of container 15.

All of the parts described thus far may be made of copper brazed together to form a closed watertight and gas tight system bounded by the inner surfaces of body 11, head 12, bellows 13, container 15 and capillaries 16 and 17. This closed system is completely filled with distilled water except for a small air bubble 23 at the top of container 15.

Details of the construction of capillary 16 are shown in FIG. 2. Its forward end 25 which opens just to the rear of head 12 is tapered to prevent it from being blocked by too close proximity to the surface of head 12. Its termination inside container 15 is flared to receive the check valve 24 which is simply a nylon ball captured between the flared end of capillary 16 and the adjacent outside surface of capillary 16 against which the flared end nearby impinges. A clearance 26 of 2 to 5 mils is provided between the ball 24 and the adjacent surface of capillary 16.

The body 11 may be divided descriptively into a neck portion X which extends from the head 12 to the forward end of water jacket 14, a cooling zone Y which extends the length of water jacket 14, and a tail pipe Z which extends from the rearward end of water jacket 14 to bellows 13. In an appropriately proportioned engine 10, the length of neck section X should be about one percent of the total length of body 11. Cooling zone Y should be about one-sixth the length of body 11 and the total length of body 11 should not be less than one foot nor longer than about four feet unless the bellows is capable of absorbing the longer strokes which will result from the use of a longer body 11.

Prior to the operation of engine 10 all air voids must be purged from the primary system. The only air that should be left remaining in the system will be collected as an air bubble 23 at the top of the container 15.

Before thermal energy H is applied to head 12, it is also important to assure that cooling water is flowing through cooling jacket 14 via inlet and outlet ports 21 and 22. Too high an energy level from the heat source might otherwise damage head 12.

The foregoing preparations having been completed, thermal energy as from a solar parabolic reflector may now be applied to head 12 to initiate the operation of engine 10.

Thermal energy absorbed by head 12 is absorbed by the distilled water inside body 11 next to head 12. As the water temperature rises, it reaches a point at which nucleate boiling begins, quickly opening up pockets or bubbles. As these bubbles begin to open up film boiling commences quickly, operating on the inner surfaces of the bubbles.

The rapid pressure rise produced by the nucleate and film boiling at head 12 causes a violent displacement of fluid rearward down the length of body 11 which instantly reaches bellows 13 causing it to expand. As the expansion and rearward displacement occurs, however, cooling within zone Y as produced by the action of cooling jacket 14 causes condensation and an ensuing contraction. This contracting effect combined with the reactive forces of the bellows and connected load drives the spent fluid forward again, the generated steam having lost most of its energy by conversion to mechanical energy delivered to the load.

As the water column returns toward head 12 filling the vacuum left by the flash boiling action a point occurs where the last vacuum pocket is filled by the inrushing molecules. At this point, the contracting water column actually acquires a tensile strength. Shrinking slightly in length, the velocity of the column increases as the pressure passes instantaneously through zero, then building up quickly to positive pressure.

The returning head of water immediately encounters a new cycle of nucleate and film boiling which initiates the ensuing cycle. The energy of the returning water column prevents the immediate expansion of water and steam in the boiling region, however, even though the absorbed heat may have raised the temperature at head 12° to 1000° F. The kinetic energy of the returning wave is first converted to heat energy which then contributes to the initiation of the nucleat boiling as groups of water molecules lose their common bonds due to Brownian motion or bombardment.

The pressure cycle accompanying the displacement cycle just described is illustrated in FIG. 3 where time is shown on the vertical scale progressing downward and displacement is shown on the horizontal scale.

Point 30 is a position immediately adjacent head 12 where nucleate boiling begins at a critical condition of 705° F and 3206 pounds per square inch. As displacement away from head 12 progresses the pressure falls such that at point 31 it has been reduced to 2000 pounds per square inch, at point 32 to 1000 pounds per square inch, then 100 psi at point 33 and 0.000 psi at point 34. At point 35, condensation begins just short of peak displacement at point 36. Region 37 is the vacuum return condition which prevails to point 38 where liquid tensile acceleration occurs shortly prior to the initiation of the succeeding cycle at point 39.

While a portion of the energy received is unavoidably lost to the cooling liquid in jacket 14, a significant portion of this energy is returned as preheat energy to the returning liquid prior to each incidence of flash boiling.

The operation of the secondary system while not described in the preceding discussion of primary system operation contributes significantly to the efficient operation of engine 10.

The first function of the secondary system is to remove any air from the primary system which may accumulate in the region of head 12. Because the pressure in container 15 is considerably below the pressure 12 during the boiling cycle, any such accumulations of air are injected into capillary 16 at end 25 and are pumped by pressure differential through check valve 24 ino container 15 where they are collected in the bubble 23. The water in container 15 which is displaced by the collected air is returned to body 11 via capillary 17. The removal of air from the region of head 12 in this manner is essential to operating efficiency.

A second function of the secondary system is to provide a means by which the primary column of water may adjust its length automatically to accommodate exterior load conditions and thereby achieve a mechanical fit within body 11. The displaced water finds space within container 15 by compression of the air bubble 23.

Certain practical considerations are essential to the proper operation of engine 10.

The speed of the engine (i.e., the operating frequency) is determined by the total length of the engine including the tail pipe Z. Thus as the tail pipe is elongated the frequency is reduced and displacement increases. Frequency may thus be reduced by increasing the length, but care must be taken that bellows 13 is not overstressed by the increased displacement.

An engine of this type having a body 11 made from three-eighths inch tubing with a total engine length of 2 to 3 feet will have a capability of delivering almost one horsepower of mechanical energy, depending on the degree of heat input at H.

The tail pipe Z may be curved in any direction so long as it is not kinked or internally restricted. Lengths of 8 to 10 feet in the three-eights inch diameter have been utilized but with special terminations to accommodate the increased displacement.

The temperature of the water in jacket 14 may be as high as 180° F for efficient operation. The engine will operate when cooling water is near the boiling point but the action will be slower and less efficient. At such elevated temperature the excess heat travels down the tail pipe and the head 12 is in danger of overheating.

FIG. 4 illustrates an engine design 40 incorporating an extended and deformed tail pipe 41 for remote delivery of output power utilizing a specially designed bellows 42 which can tolerate the increases displacement resulting from the increased length of the tail pipe 41. The remainder of engine 40 includes all of the parts shown in FIG. 1 although the simplified representation of FIG. 4 suggests only a cooling jacket 43 and a head 44.

FIG. 5 illustrates a compound engine 45 which couples together two simple engines 46 and 47 in a push pull arrangement which operates a vibrating reed or lever 48. Each of the engines 46 and 47 has its own head 12', tail pipe Z' and bellows 13', each bellows terminating at 48, but a common cooling jacket 49 is shared by both engines 46 and 47.

The hydraulic isolator 50 of FIG. 6 is intended for attachment at the end of the tail pipe 10 of FIG. 1 in place of bellows 13 when the output power is to be delivered to a driven hydraulic system while preventing the intermixing of the distilled water of engine 10 with the hydraulic fluid of the driven system. The isolator 50 has a spherical shell comprised of an inlet hemisphere 51 and an outlet hemisphere 52. Clamped between hemispheres 51 and 52 is a flexible membrane 53 which serves as a fluid tight seal between the two hemispheres. Hemisphere 51 communicates with body 11 of engine 10 via an inlet port 54 which admits distilled water from engine 10 while hemisphere 52 communicates with the secondary hydraulic system via outlet port 55 which admits hydraulic fluid from the driven system. The pressure and displacement wave fronts 56 are transmitted with minimal losses between ports 54 and 55.

A variation of the hydraulic engine of the invention in the form of an open engine system 60 is shown in FIG. 7, the engine 60 comprising a head 61, a body and tail pipe section 62, a combined cooling and air exhaust container 63 with an exhaust capillary 64 and a load tank 65. In this case, the output energy delivered by tail pipe 62 to tank 65 contains a body of fluid requiring agitation. The tail pipe 62 extends downward into tank 65 so that its end is submerged in the contained fluid. Ideally, an isolator 50 as shown in FIG. 6 would be utilized to isolate the engine fluid from the fluid in tank 65. Air extracted by capillary 64 is given off to the atmosphere as it rises to the surface of the coolant water 66 of container 63. In this embodiment of the invention the bellows is eliminated as a restriction on the length of the tail pipe 62.

FIG. 8 is a simplified representation of engine 10 of FIG. 1 driving a mechanical load 67. The mechanical load 67 can take any one of many forms including, for example, a means for converting mechanical to electrical energy or it might simply comprise a load of material which requires vibration as a part of a processing cycle.

FIG. 9 illustrates an adaptation of the hydraulic engine of the invention as a boat engine 70 comprising a head 71, a body 72, a water body 73, a finned cooling jacket 74 and a tail pipe 75. The body 72 and flexible bag 73 which is attached at the tail end of body 72 are enclosed in jacket 74, and while the distilled engine water is confined within body 72 and bag 73, water from the lake or river traveled by the boat is admitted through tail pipe 75 to the interior of jacket 74 surrounding body 72 and bag 73. The pulsating energy from body 72 is transmitted through bag 73 to the fluid contained in jacket 74 which carries it out through tail pipe 75 where it may be utilized along with appropriate check valves or other mechanical means to propel the boat.

The pump 80 of FIG. 10 is yet another embodiment of the hydraulic engine of the invention, comprising a head 81, a body and tail pipe section 82, a bellows 83, a cooling jacket 84, and inlet and outlet check valves, 85 and 86, respectively. Both body 82 and bellows 83 are contained within the cooling jacket 84, the cooling jacket 84 also serving as the main chamber of pump 80. Head 81, body and tail pipe section 83 and the bellows 83 along with the cooling jacket 84 and the secondary system (not shown) function in the manner described for engine 10 of FIG. 1. In this case, however, bellows 83 imparts the output energy to the fluid contained within jacket 84, this fluid being at the same time the fluid to be moved by pump 80. As bellows 83 expands the pumped fluid is moved out through valve 86; as bellows 83 contacts more fluid is drawn in through valve 85. Valve 85 is designed to admit fluid into jacket 84 but to block flow in the opposite direction. Similarly, valve 86 passes exhausting fluid but blocks flow into jacket 84.

The salient features of engine 10 and of the several adaptations described are the simplicity of construction, the very limited number of moving parts and the simple and compact construction as outlined in the objects of the invention.

Although but a few embodiments of the invention have been illustrated and described, it will be apparent to those skilled in the art that various changes and modifications may be made therein without departing from the spirit of the invention or from the scope of the appended claims.

What is claimed is:

1. A method of absorbing thermal energy and transforming it into an oscillating mechanical function comprising the steps of:
    confining a liquid in a column closed at one end by a thermal absorbing head and at the other end by a flexible means,
    directing concentrated thermal energy onto said head to raise the temperature in the column until it reaches a point at which nucleate boiling of the liquid begins,
    said boiling of the liquid causing a violent displacement of liquid transferred to its fluid stage to actuate said flexible means,
    said fluid cooling and condensing on its expansion and displacement movement just before expansion of said flexible means,
    said contracting effect combined with the reactive forces of the flexible means connected to a load drives the spent condensed fluid back toward said head,
    the returning fluid condensed to liquid encountering a new cycle of nucleate boiling liquid which initiates an ensuing cycle, thereby providing oscillatory mechanical movement of said flexible means, and
    cooling the liquid confined in said column at said thermal absorbing head end of said column.

2. The method set forth in claim 1 wherein:
said thermal energy comprises solar energy.

3. The method set forth in claim 1 wherein:
said liquid comprises water.

4. The method set forth in claim 1 wherein:
said flexible means comprises a bellows.

5. The method set forth in claim 1 in further combination with the step of cooling the outer periphery of the column at its thermal absorbing head end thereof.

6. A hydraulic engine comprising:
    a hollow tubular body closed at one end by a heat absorbing head and at the other end by a flexible member,
    a hollow container mounted on the outside of said tubular body at a point between its ends,
    a hollow cooling jacket surrounding at least a portion of said one end of said tubular body, a first capillary tube having one end opening adjacent said head and the other end terminating in said container, a second capillary tube having one end terminating in said container and the other terminating in said tubular body at said other end, and a check valve means within the other end of said first capillary tube, whereby when said tubular body is filled and said container partially filled with a liquid and thermal heat of a predetermined value is directed onto said head, the liquid in said tubular body adjacent said head reaching a point at which nucleate boiling begins causing a displacement of fluid toward said flexible member causing it to flex to perform a useful work function.

7. The hydraulic engine set forth in claim 6 wherein: said first capillary tube is mounted within said tubular body having one end opening adjacent said head and the other end passing outwardly through said tubular body and into said container.

8. The hydraulic engine set forth in claim 7 wherein: said other end of said first capillary tube is looped over on itself, and said check valve comprises a ball valve having a valve seat formed in said end of said first capillary tube for receiving a ball valve.

9. The hydraulic engine set forth in claim 8 wherein: said check valve is positioned below the liquid in said partially filled container.

10. The hydraulic engine set forth in claim 9 wherein: said one end of said second capillary tube is positioned below the surface of the liquid in said partially filled container.

11. The hydraulic engine set forth in claim 6 wherein: said flexible member comprises a bellows.

12. The hydraulic engine set forth in claim 6 wherein; said other end of said second capillary tube terminates in a sump.

13. The hydraulic engine set forth in claim 6 in further combination with:

a load actuated by the flexing of said flexible member.

14. The hydraulic engine set forth in claim 6 wherein: said flexible member comprises an expandable bag.

15. A hydraulic engine comprising:

a first hollow tubular body closed at one end by a heat absorbing head and at the other end by a first bellows, a first hollow cooling jacket surrounding at least a portion of said one end of said first tubular body, a second hollow tubular body closed at one end by a heat absorbing head and the other end by a second bellows, a second hollow cooling jacket surrounding at least a portion of said one end of said second tubular member, the free ends of said first and second bellows being axially aligned, and a lever mounted between said free ends of said first and second bellows for movement by each of said bellows upon expansion thereof, whereby when said first and second tubular bodies are filled with a liquid and thermal heat of a predetermined value is directed onto said heads of each of said first and second tubular bodies adjacent their heads reach a point at which nucleate boiling begins causing a displacement of fluid toward said first and second bellows causing them to expand to move said lever.

* * * * *